(12) United States Patent
Goldman

(10) Patent No.: US 6,611,866 B1
(45) Date of Patent: Aug. 26, 2003

(54) MANAGEMENT OBJECT FOR AGGREGATED NETWORK DEVICE STATUS

(75) Inventor: Tomasz Goldman, Hellerup (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/383,673

(22) Filed: Aug. 26, 1999

Related U.S. Application Data

(60) Provisional application No. 60/098,087, filed on Aug. 27, 1998.

(51) Int. Cl.[7] .............................................. G06F 13/00
(52) U.S. Cl. ..................... 709/224; 709/220; 709/230
(58) Field of Search ..................... 709/220, 223, 709/224, 230, 238, 313, 328

(56) References Cited

U.S. PATENT DOCUMENTS

| | | | | |
|---|---|---|---|---|
| 5,559,955 A | * | 9/1996 | Dev et al. ........................ 714/4 |
| 5,710,885 A | * | 1/1998 | Bondi .......................... 709/224 |
| 5,751,964 A | * | 5/1998 | Ordanic et al. ............. 709/224 |
| 5,926,463 A | * | 7/1999 | Ahearn et al. ............... 370/254 |
| 6,122,639 A | * | 9/2000 | Babu et al. .................. 707/103 |
| 6,175,866 B1 | * | 1/2001 | Holloway et al. ........... 709/223 |
| 6,269,398 B1 | * | 7/2001 | Leong et al. ................ 709/224 |
| 6,721,845 | * | 8/2001 | Richardson .................. 345/356 |

OTHER PUBLICATIONS

M. Rose and K. McCloghrie, RFC 1155 "Structure and Identification of Management Information for TCP/IPbased Internets," May, 1990.

K. McCloghrie and M. Rose, RFC 1213 "Management Information Base for Network Management of TCP/IPbased internets: MIB–II," Mar., 1991.

M. Rose and K. McCloghrie, RFC 1212 "Concise MIB Definitions," Mar., 1991.

\* cited by examiner

Primary Examiner—Viet D. Vu
(74) Attorney, Agent, or Firm—Fish & Richardson P.C.

(57) ABSTRACT

A method and apparatus for collecting data objects of network devices into a customized aggregation, such as a management information base. A system administrator can choose the status information and the method of aggregation of the data objects. Objects are queried and modified, and are used to control the network devices by protocols such as Simple Network Management Protocol.

25 Claims, 6 Drawing Sheets

MANAGEMENT OBJECT FOR AGGREGATED NETWORK DEVICE STATUS

MANAGEMENT OBJECTS FOR AGGREGATED STATUS

Priority based on provisional patent application, Ser. No. 60/098,087 filed Aug. 27, 1998 entitled, "Management Objects for Aggregated Status" is claimed.

This invention relates to network devices and device status information, and more particularly, to a management object that stores aggregate status information.

BACKGROUND OF THE INVENTION

Individual devices in a network typically provide a large amount of status information. This information includes information about the health of the device (such as the internal operating temperature of the device) and information about the health of the network (such as the amount of traffic congestion on the network links). This status information is collected and reported to the system administrator, and can be accessed by a centralized control or management unit.

In order for a network administrator to get an overview of the health of the network, this large amount of data is aggregated into a few pieces of status information. Such an aggregation can be performed in the network device or the network management station and manufacturers of the network device and/or the management station software decide how to perform the aggregation. The network administrator has no control over the aggregation.

SUMMARY OF THE INVENTION

Various implementations of the invention may include one or more of the following features.

In general, in one aspect, the invention features a computer implemented method of managing the status of devices on a network including collecting data objects that describe the status of the devices, aggregating the data objects into a common set, querying the set of data objects to determine the status of the devices, and customizing the set of data objects, wherein the data objects each contain a collection of references to other objects, a monitoring mode of the object, and a range of numbers that indicate the health state of the object.

Implementations may include customizing the set of data objects by deciding the status information that is included in the data objects, deciding the way that the data objects will be aggregated into the set of data objects, dynamically adding objects to the set, and dynamically removing objects from the set or by dynamically changing the range of numbers that indicate the health of state of the objects. In an implementation, the common set of aggregated objects is a management information base (MIB).

Implementations may also include manipulating the objects in the MIB in general or manipulating the MIB by simple network management protocol (SNMP).

In another aspect, the invention features, in a network device, a computer implemented method of managing status information in a network, including collecting status information about the network, condensing the status information into at least one object, selectively viewing the status information contained in the object and selectively changing the status information in the object.

In an implementation the at least one object are data structures.

In another implementation, the collecting status information includes collecting the status information into a management information base (MIB), and the condensing the status information includes selectively choosing status information of interest, storing status information which was not chosen or deleting information which was not chosen.

In another implementation, the method includes using the at least one object to control at least one additional device on the network, which could be controlled by Simple Network Management Protocol (SNMP).

In another aspect, the invention features, in a network management station, a method of status information management for devices on a network, including aggregating a plurality of software objects associated with the network devices into a management information base (MIB), accessing software objects from the MIB, querying the objects to determine the operational state of the network devices, manipulating the objects to control the devices, and selectively changing the status information contained within the objects.

In an implementation, the method also includes selectively choosing the way the plurality of software objects are aggregated into the MIB, and dynamically adding and removing objects in the MIB.

In an implementation the software objects are data structures-and the status information is operational state information of the network devices which may include parameters associated with the operation of the network devices, parameter value ranges indicative of normal operation of the network devices, and syntax that indicates whether the network devices are operating properly.

In yet another aspect, the invention features a computer program residing on a computer-readable medium comprising instructions for causing a computer to collect status information about the network, condense the status information into at least one object, selectively view the status information contained in the object and selectively change the status information in the object.

In an implementation, the at least one object are data structures.

In another implementation, the computer program also includes instructions to collect the status information into a management information base (MIB). The instructions to condense the status information comprise instructions to selectively choose status information of interest. The instructions to condense the status information further comprise instructions to store status information which was not chosen. The instructions to condense the status information further comprise instructions to delete information which was not chosen.

In another implementation, the computer program includes instructions to use the at least one object to control at least one additional device on the network and the one additional device is controlled by Simple Network Management Protocol (SNMP).

In still another aspect, the invention features a processor-based apparatus on a network including a processor, a configurable peripheral device operationally coupled to the processor and to the network, a memory operationally coupled to the memory storing instructions for causing the processor to collect status information about the network, condense the status information into at least one object, selectively view the status information contained in the object, and selectively change the status information in the object.

In another aspect, the invention features a network management station having access to one or more network devices, including a processor, means to communicate with the network devices, a memory operationally coupled to the processor, the memory storing instructions causing the processor to aggregate a plurality of software objects associated with the network devices into a management information base (MIB), access software objects from the MIB, query the objects to determine the operational state of the network devices, manipulate the objects to control the devices, and selectively change the status information contained within the objects.

The invention may provide one or more of the following advantages.

The systems and techniques described here can enable status information generated by network devices to be aggregated into a few pieces of status information. Such aggregation can be performed in the network device or in a management station.

A network administrator can customize data aggregation, such as identifying the information to be aggregated and the method of aggregation.

The details of one or more embodiments are set forth in the accompanying drawings and the description below. Other features, objects, and advantages of the invention will be apparent from the description and drawings, and from the claims.

DETAILED DESCRIPTION

Figure 1:
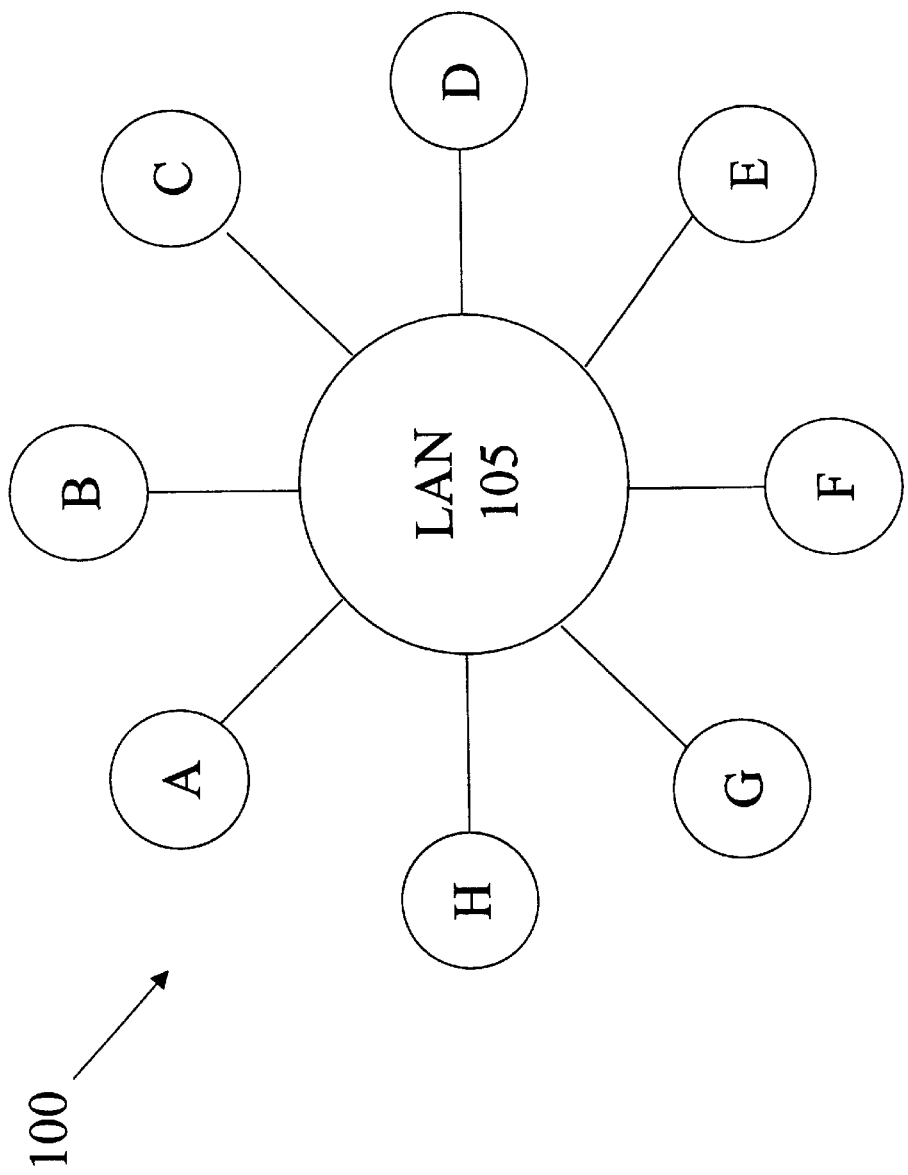
FIG. 1 illustrates a network.
Figure 2:
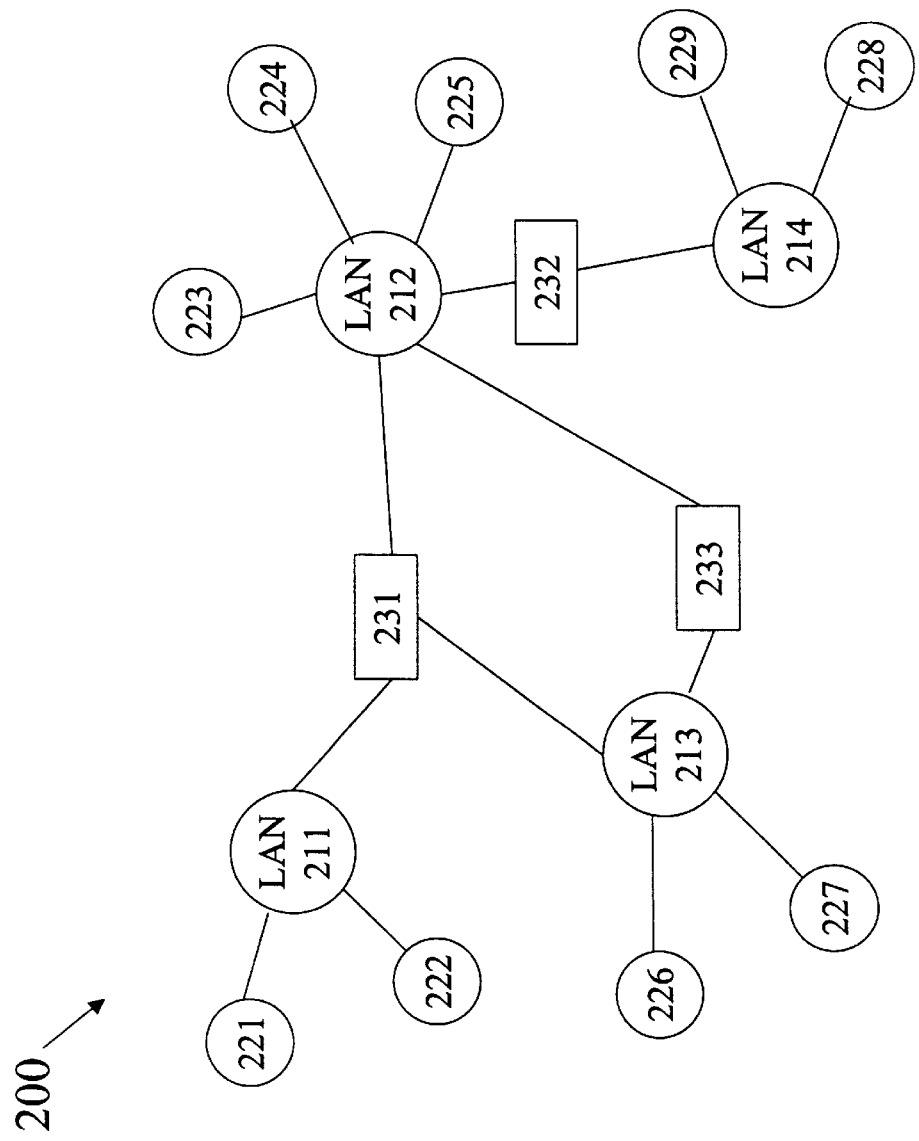
FIG. 2 illustrates a source routing network.

FIG. 1 illustrates a simple network 100 including a local area network (LAN) 105 and nodes A-H. Nodes A-H can include computers and other data processing devices which share and exchange data. Each of the nodes A-F provide a potentially large amount of status data which is reported to a management station. The management station may be located at one of the nodes A-H or in the LAN 105. This status information is aggregated into a few pieces of status information either in the individual network device or in the management station. FIG. 1 illustrates a simple network, but other embodiments are not limited to the simple LAN. For example, FIG. 2 illustrates a source routing network 200. In the network 200 four local area networks 211–214 are interconnected by source routing bridges 231–233. LAN 211 includes nodes 221–222, LAN 212 includes nodes 223–225, LAN 213 includes nodes 226–227, and LAN 214 includes nodes 228–229. Any one of the nodes can send data frames including status information about the node to another node on the same LAN such as the management station. Status information can also be sent to another LAN through the source routing bridges. Status information can include information not only about the individual nodes but also about the network itself (including the individual LANs) and the source routing bridges.

Figure 3:
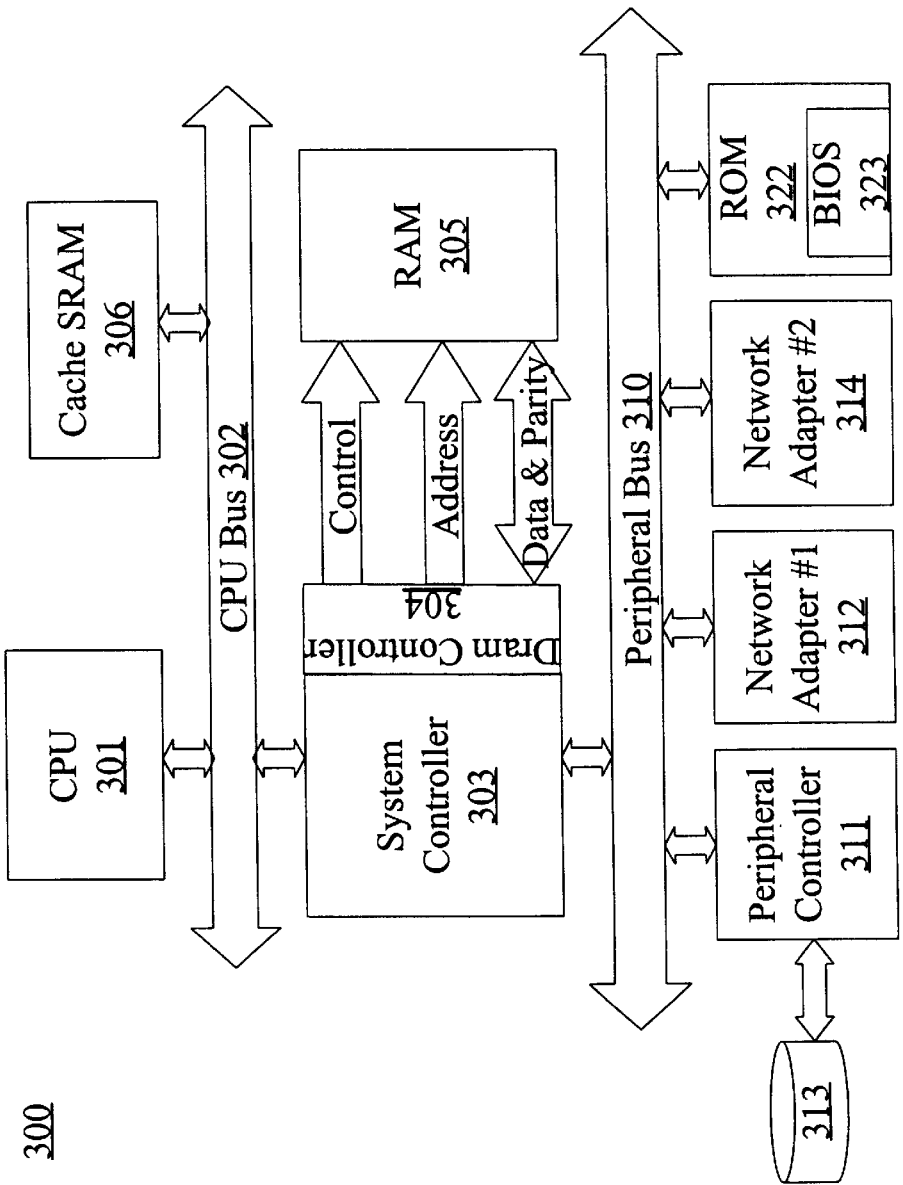
FIG. 3 illustrates a network device.

FIG. 3 depicts physical resources of an exemplary network device 300. The device 300 has a central processor 301 connected to a processor host bus 302 over which it provides data, address and control signals. The processor 301 may be any conventional general purpose single- or multi-chip processor such as Pentium processor, a Pentium Pro processor, Pentium II processor, a MIPS processor, a Power PC processor or an ALPHA processor. In addition, the processor 301 may be any conventional special purpose processor such as a digital signal processor or a network communications protocol processor.

The device 300 includes a system controller 303 having an integrated RAM memory controller 304 connected to the host bus 302. The controller 303 provides an interface to random access memory (RAM) 305. The RAM 305 can store status information concerning the health of the device 300. RAM 305 can also store information regarding the status aggregation software used to compile the objects into a manageable format.

The system controller 303 also provides host bus to peripheral bus bridging functions. The controller 303 thereby permits signals on the processor host bus 302 to be compatibly exchanged with signals on a primary peripheral bus 310. The peripheral bus 310 may be for example a Peripheral Component Interconnect (PCI) bus, an Industry Standard Architecture (ISA) bus or Micro-Channel bus, or other bus structure. The device 300 may also include a first network adaptor 312 and a second network adaptor 314 coupled to the peripheral bus 310. The network adapters 312 and 314 may be for example, a modem, Ethernet card, or other network communications device. The network adapters can be used to transfer status information onto the network for aggregation at a management or control station. The device 300 may also include additional peripherals such as a hard disk drive control interface 311 to couple a hard disk 313 to the peripheral bus 310.

The device 300 includes non-volatile ROM memory 322 to store basic computer software routines. ROM 322 may include alterable memory, such as EEPROM (Electronically Erasable Programmable Read only Memory), to store configuration data. ROM 322 may include software to test and initialize device hardware and may include a device operating system, and application software. For example, in a bridge, the ROM 322 may include operating system software to control peripheral devices 311–312, 314 and may include network application software to perform transparent or source-routing bridging. In a device 300 implementation having a hard disk drive 313, the ROM may include "boot" routines to load operating system and application software from disk 313.

Status information can compile into large amounts of data in a short period of time. In an implementation, a network administrator can customize data aggregation to include only that information that the administrator desires to compile. Such information may include the substantive information and the method that the status information is aggregated. Substantive information can include but is not limited to the following information, temperature, current load, whether the fans are operating, and network traffic in and around the device. In one embodiment, the aggregated status information is collected into a Management Information Base (MIB). The MIB can include data "objects" that can be manipulated by a network administrator implementing the simple network management protocol (SNMP). An object can be any data structure that contains information about the network device as is discussed below. A MIB specifies how each object can be used by a SNMP management station. Typically, a SNMP management station can either access the object to get status information, or control the individual device (node) by manipulating the object.

In an embodiment, objects are defined using Abstract Syntax Notation One ("ASN.1"). An object is referred to as an object type. Each object also has an object instance. An object type simply refers to a kind of object. An object instance is an object type which has been bound to a value. Each object type has a name, a syntax, and an encoding associated with it. The name is represented as an object identifier, which are assigned by the system administrator which specifies an object type. The object type along with the object instant uniquely defines a specific occurrence of an object. In an implementation, within a particular object a textual string called an object identifier is also used to refer to an object type.

The syntax of the object type defines the data structure given to the object. In an implementation, the ASN.1 language is used to define these structures. The syntax choices can be but are not limited to integer, octet string and null. The encoding of the object type is simply how instances of that object are represented using the object type'syntax. The object type syntax also depends on how the object is representing when it is transmitted on the network. Therefore, the object syntax may be device dependent.

Object types consist of five fields. The following table defines the object fields:

| Field | Description |
|---|---|
| Object | A textual name called the Object. Descriptor along with the corresponding Object Identifier. |
| Syntax | The abstract syntax which must resolve to an instance of the ASN.1 type ObjectSyntax. |
| Definition | A textual description of the semantics of the object type. |
| Access | One of Read-only, read-write, write-only or not accessible. |
| Status | One of Mandatory, optional, or obsolete. |

In an implementation, the object name (also called the object identifier) is typically a textual string. The syntax is the data structure appropriate for the content of the object. The definition is a brief description of what the object is. The Access defines whether the object can be read, write, or read-write. The status defines the requirement of the object, that is whether the object is mandatory in the device, if it is optional whether or not the object is present or if it is obsolete and therefore not necessary to the device. The following are some examples of typical objects that may be present in a MIB.

| | |
|---|---|
| Object | atIndex |
| Syntax | Integer |
| Definition | Interface number for the physical address. |
| Access | read-write |
| Status | mandatory |

The object shown above is a mandatory interface number represented by an integer that can be changed by the system administrator.

| | |
|---|---|
| Object | atPhysAddress |
| Syntax | Octet String |
| Definition | Media-dependent physical address. |
| Access | read-write |
| Status | mandatory |

The above object contains a physical address represented by an octet string of the device associated with the object. This address can also be changed by the system administrator.

| | |
|---|---|
| Object | atNetAddress |
| Syntax | NetworkAddress |
| Definition | The network address of the media-dependent physical address. |
| Access | read-write |
| Status | mandatory |

The above object defines the address on the network.

In an implementation, the following objects can be used in an MIB to define the state of a network device.

| | |
|---|---|
| Object | atFan |
| Syntax | Null |
| Definition | State of fan on/off. |
| Access | read-write |
| Status | mandatory |

The above object defines the state of the fan on the network device.

The following three objects will define the temperature of a network device as well as the range:

| | |
|---|---|
| Object | atTemperature |
| Syntax | DisplayString |
| Definition | Temperature of the device. |
| Access | read-write |
| Status | mandatory |
| Object | atTempRange |
| Syntax | DisplayString |
| Definition | The normal operating temperature range of the device. |
| Access | read-write |
| Status | mandatory |
| Object | atTempIndicate |
| Syntax | Octet String |
| Definition | Indicate Good, Warning, Bad. |
| Access | read-write |
| Status | mandatory |

The above three objects provide an example of how different objects in an MIB are used to aggregate specific information about a device. The first object atTemperature contains the string for the temperature reading of the device. This object references the two other objects atTempRange and atTempIndicate. The atTempRange object will contain a string that indicates the normal operating range of the device. The atTempIndicate object is used to indicate if the device is in a good, bad or warning state based on the temperature range in atTempRange. For example, atTemperature indicates that the device is operating at 55 C. The atTempRange stores information that the normal temperature is 10–60 C, wherein 20–45 C is a good state, 10–20 C and 45–60 C are warning states, and any temperature below 10 C or above 60 C is a bad state. The atTempIndicate object will thus reference both the atTemperature and the atTempRange objects and indicate a warning state. A system administrator can access all three objects in the MIB and determine the appropriate action. In an implementation, the system administrator can adjust the range in atTempRange, and the state information in atTempIndicate.

An MIB can contain many different objects such as the temperature objects in the example discussed above. The objects are ordered in an MIB in a manner consistent with the needs of the System Administrator. The System Administrator can dynamically alter objects to meet the changing needs of the network, and to meet the changing needs of the system administrator.

Figure 4A:
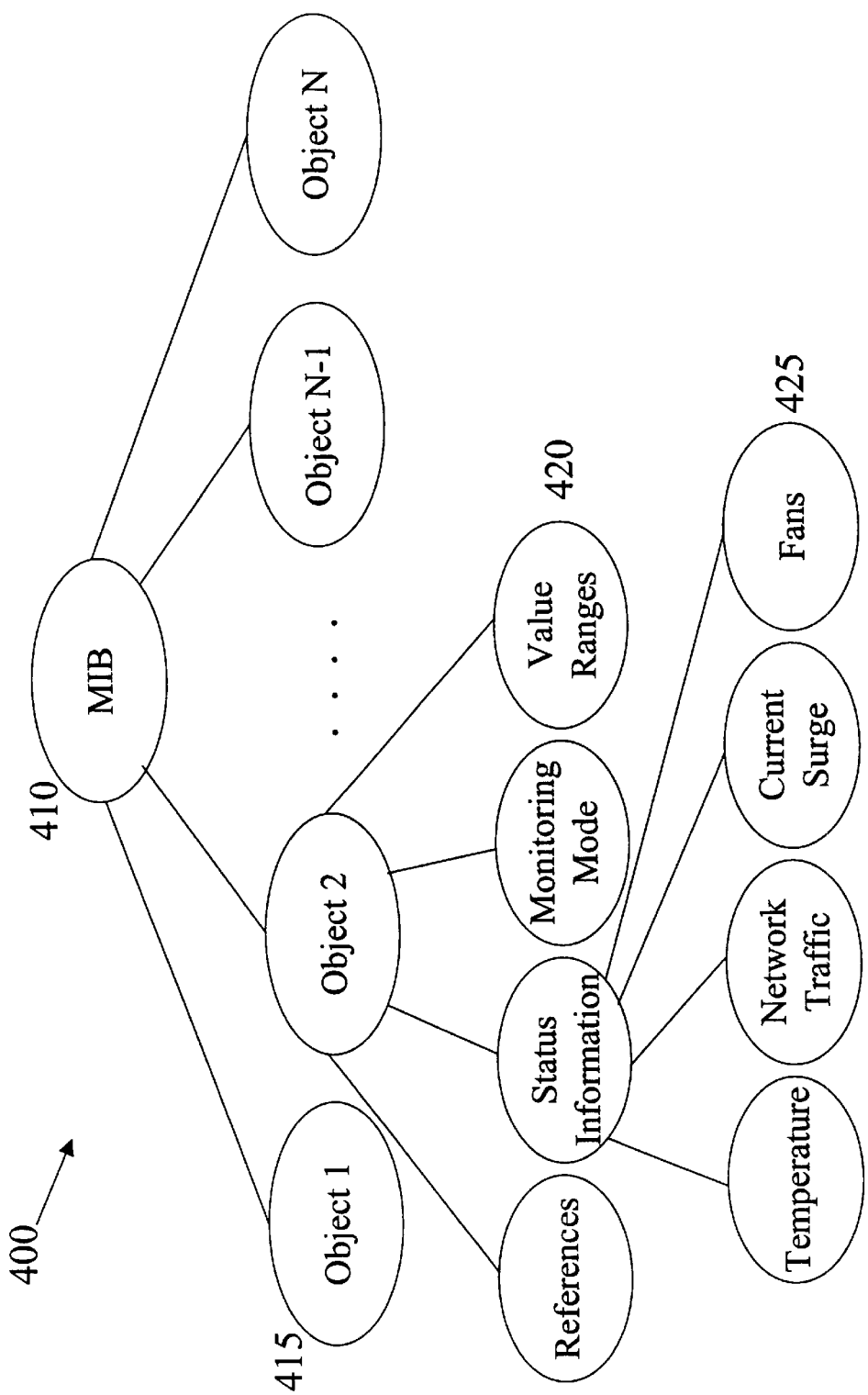
FIG. 4A illustrates a system diagram of an implementation of a Management Information Base.
Figure 4B:
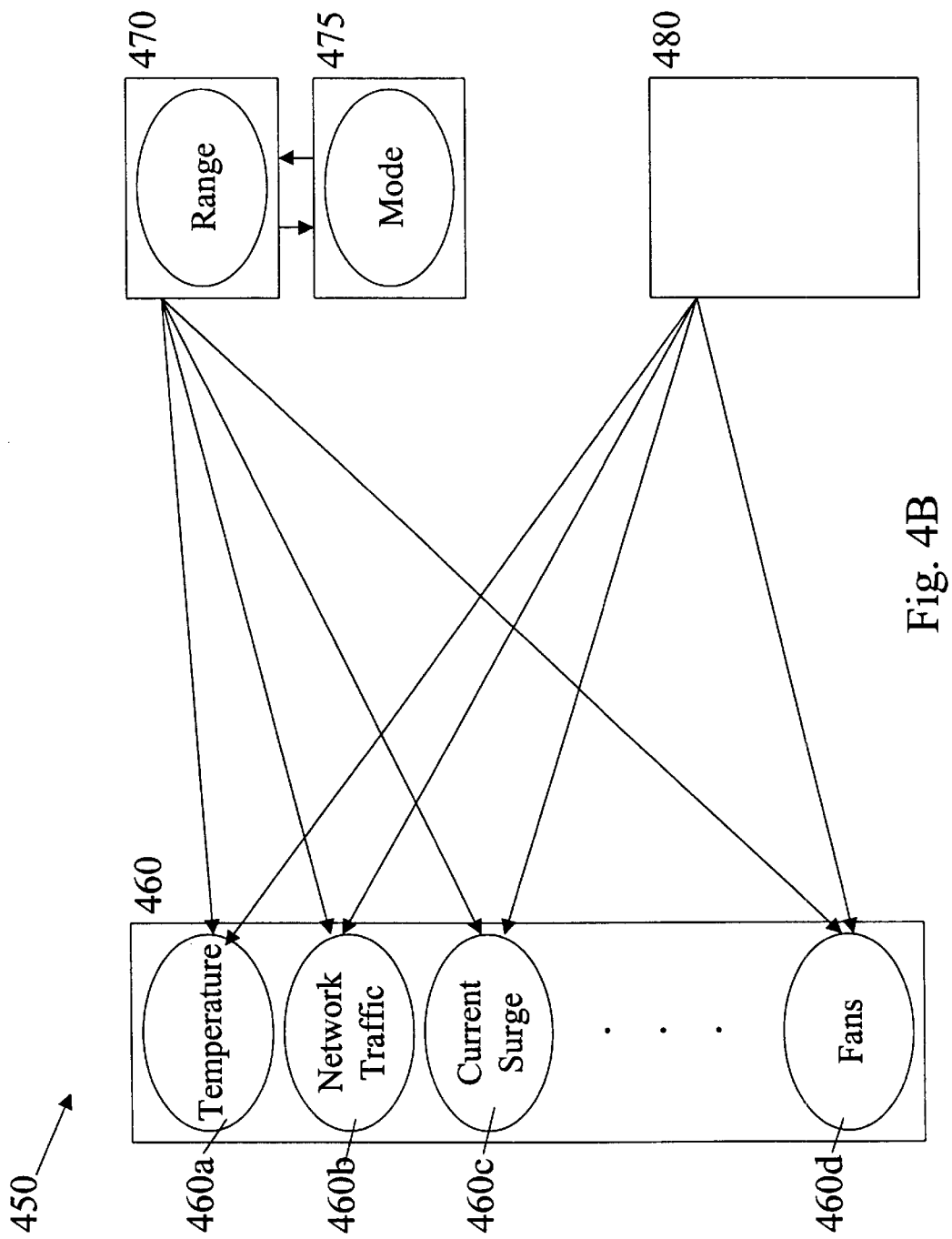
FIG. 4B illustrates a system diagram of another implementation of a Management Information Base.

FIG. 4A illustrates a diagram 400 of a MIB 410 showing an implementation of the ordering of aggregation of objects 415. A MIB 410 can consist of a finite number of objects 415, in this case N health objects. Each object contains status information about a respective node on the network. The figure illustrates that health object 2 contains status information 420 consisting of references to other objects, status information about the node, the mode in which the information is monitored and the value ranges. Reference information includes other object information so that the health of another node can be accessed through object 2. Status information contains health information 425 including, the temperature of the device, the network traffic in and around the device, any current surges in the device, and whether the cooling fans are operational. Other implementations are not limited to the types of status information or the ordering of the objects in the MIB as discussed above. FIG. 4B illustrates another implementation of an MIB. The figure illustrates a further embodiment in which several MIBs are used to store aggregate object information. Several MIBs 450 are arranged so that particular information is stored in a given MIB. A status information MIB 460 contains objects pertaining to temperature 460*a*, network traffic 460*b*, current surges 460*c*, and fans 460*d*. The status information MIB 460 may contain objects pertaining the other status information about the node. A range MIB 470 contains an object having aggregated range information. The range MIB 470 can contain the range information for all of the individual objects in the status information MIB 460. For example, the range MIB 470 will contain numeric values, that is, the normal operating temperature ranges for several different nodes on the network (e.g. node 1 5C–45C, node 2 2C–50C, node N 10C–55C). A further example concerns the fans. The only information concerning the fans that an administrator would want to know is whether they are on or off. Therefore the range MIB would contain only simple state information, that is, "on" and "off". In the temperature example above, state information can also be used. For example, instead of giving temperature values, three states can be provided, that is, "good", "warning" and "bad".

A mode MIB 475 contains what monitoring mode to which each node is subject. For example for the temperature range, the mode MIB contains information for each device concerning what temperature scale is used and whether it is a continuous or discrete spectrum. For fans example discussed above, the monitoring mode is simply "ON/OFF".

In implementations, the network administrator can dynamically add or remove MIB objects to this collection, and he can change the value ranges that indicate the health sate of the objects. By querying the values of the aggregated health objects, consolidated status information can now be collected from network devices implementing these MIBs. The network administrator also has the freedom to choose the method of aggregation. A shell 480 for holding a collection of network administrator specified MIB objects is provided. The network administrator can use a "build" tool to specify a new aggregate object and then download the object to a device on the network. A "runtime" tool collects the objects. A device can then be used to perform the actual collecting and consolidating of the status information.

Figure 5:
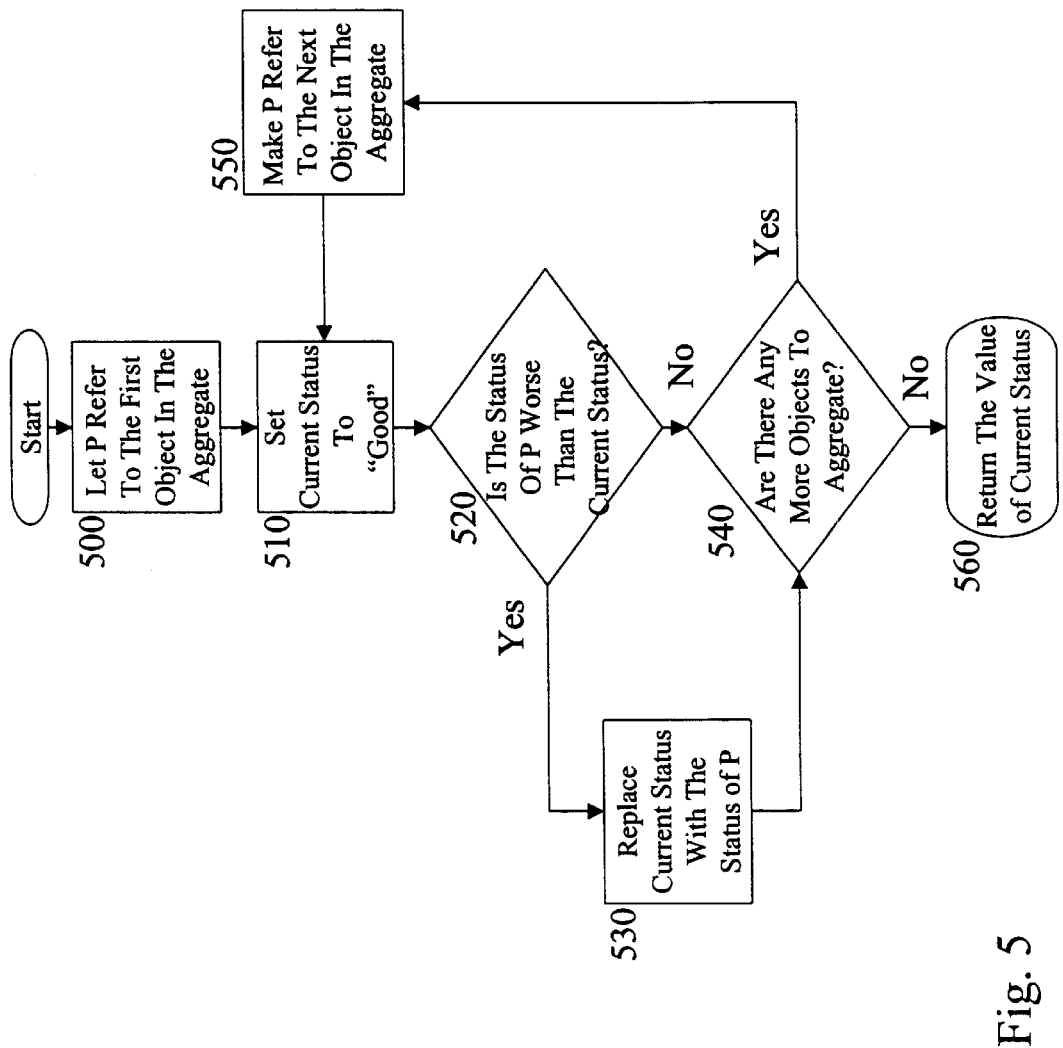
FIG. 5 illustrates a flow chart of an implementation of a method of aggregation.

FIG. 5 illustrates an implementation of a method of aggregation. An object in the aggregate is referred to as P at 500. A current status variable that represents the worst status of all of the objects in the aggregate is set to "good" at 510. This "good" status may refer to the operating temperature of the devices, that the current level is good in the device or that the fan is running properly on the network. The status of P is compared with the current status to see if it is worse than the current status at 520. If the status of P is worse than the current status, then the current status of the aggregate is set to the status of P at 530. This status may indicate a warning or a bad temperature or temperature level, or that the fan is faulty. It is then checked if there are more objects to aggregate at 540. If there are more objects then P then represents the next object at 550. The process is then repeated at 510 until all objects have been included in the aggregate. During the process if the status of P is worse than the current status, then the current status is replaced with that worse status. In this embodiment, the status of the aggregate also represents the worst status of the device on the network. This embodiment enables a system administrator to group devices in such a way that he can query a group of devices for their status.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high level procedural or object-oriented programming language, or in assembly or machine language if desired; and in any case, the language may be a compiled or interpreted language. Suitable processors include, by way of example, both general and special purpose microprocessors. Generally, a processor will receive instructions and data from read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing may be supplemented by, or incorporated in, specially-designed ASICs (application-specific integrated circuits).

What is claimed is:

1. A computer implemented method of managing the status of devices on a network, comprising:
    collecting data objects that describe the status of the devices;
    aggregating the data objects into a common set;
    querying the set of data objects to determine the status of the devices; and
    customizing the set of data objects according to preferences of a network administrator,
    wherein the data objects each contain a collection of references to other objects, a monitoring mode of the object, and a range of numbers that indicate the health state of the object.

2. The method of claim 1 wherein customizing the set of data objects comprises:

deciding the status information that is included in the data objects.

3. The method of claim 1 wherein customizing the set of data objects comprises:

deciding the way that the data objects will be aggregated into the set of data objects.

4. The method of claim 1 wherein customizing the set of data objects comprises:

dynamically adding objects to the set; and dynamically removing objects from the set.

5. The method of claim 1 wherein customizing the set of data objects comprises:

dynamically changing the range of numbers that indicate the health of state of the objects.

6. The method of claim 1 wherein the common set of aggregated objects is a management information base (MIB).

7. The method of claim 6 further comprising:

manipulating the objects in the MIB.

8. The method of claim 7 further comprising:

manipulating the MIB by simple network management protocol (SNMP).

9. In a network management station, a method of status information management for devices on a network, comprising:

aggregating a plurality of software objects associated with the network devices into a management information base (MIB);

accessing software objects from the MIB;

querying the objects to determine the operational state of the network devices;

manipulating the objects to control the devices; and selectively changing the status information contained within the objects; and dynamically adding and removing objects in the MIB.

10. The method of claim 9 further comprising:

selectively choosing the way the plurality of software objects are aggregated into the MIB.

11. The method of claim 9 wherein the software objects are data structures.

12. The method of claim 9 wherein the status information is operational state information of the network devices.

13. The method of claim 12 wherein the operational state information comprises:

parameters associated with the operation of the network devices;

parameter value ranges indicative of normal operation of the network devices; and syntax that indicates whether the network devices are operating properly.

14. A network management station having access to one or more network devices, comprising:

a processor;

means to communicate with the network devices;

a memory operationally coupled to the processor, the memory storing instructions causing the processor to:

aggregate a plurality of software objects associated with the network devices into a management information base (MIB);

access software objects from the MIB;

query the objects to determine the operational state of the network devices;

manipulate the objects to control the devices;

selectively change the status information contained within the objects; and dynamically adding and removing objects in the MIB.

15. An article comprising a machine-readable medium embodying information indicative of instructions that when performed by one or more machines result in operations to manage the status of devices on a network, the operations comprising:

collecting data objects that describe the status of the devices;

aggregating the data objects into a common set;

querying the set of data objects to determine the status of the devices; and customizing the set of data objects according to preferences of a network administrator, wherein the data objects each contain a collection of references to other objects, a monitoring mode of the object, and a range of numbers that indicate the health state of the object.

16. The article of claim 15 wherein customizing the set of data objects comprises:

deciding the status information that is included in the data objects.

17. The article of claim 15 wherein customizing the set of data objects comprises:

deciding the way that the data objects will be aggregated into the set of data objects.

18. The article of claim 15 wherein customizing the set of data objects comprises:

dynamically adding objects to the set; and dynamically removing objects from the set.

19. The article of claim 15 wherein customizing the set of data objects comprises:

dynamically changing the range of numbers that indicate the health of state of the objects.

20. The article of claim 15 wherein the common set of aggregated objects is a management information base (MIB).

21. The article of claim 20 wherein the operations further comprise manipulating the objects in the MIB.

22. The article of claim 21 wherein the operations further comprise manipulating the MIB by simple network management protocol (SNMP).

23. An article comprising a machine-readable medium embodying information indicative of instructions that when performed by one or more machines result in operations to manage status information for devices on a network, the operations comprising:

aggregating a plurality of software objects associated with the network devices into a management information base (MIB);

accessing software objects from the MIB;

querying the objects to determine the operational state of the network devices;

manipulating the objects to control the devices; and selectively changing the status information contained within the objects; and dynamically adding and removing objects in the MIB.

24. The article of claim 23 wherein the operations further comprise selectively choosing the way the plurality of software objects are aggregated into the MIB.

25. The article of claim 23 wherein the status information comprises operational state information of the network devices, and the operational state information comprises:

parameters associated with the operation of the network devices;

parameter value ranges indicative of normal operation of the network devices; and syntax that indicates whether the network devices are operating properly.

* * * * *